Dec. 31, 1957 V. E. MATULAITIS 2,818,491
ELECTRODE WEAR COMPENSATION
Filed July 13, 1955
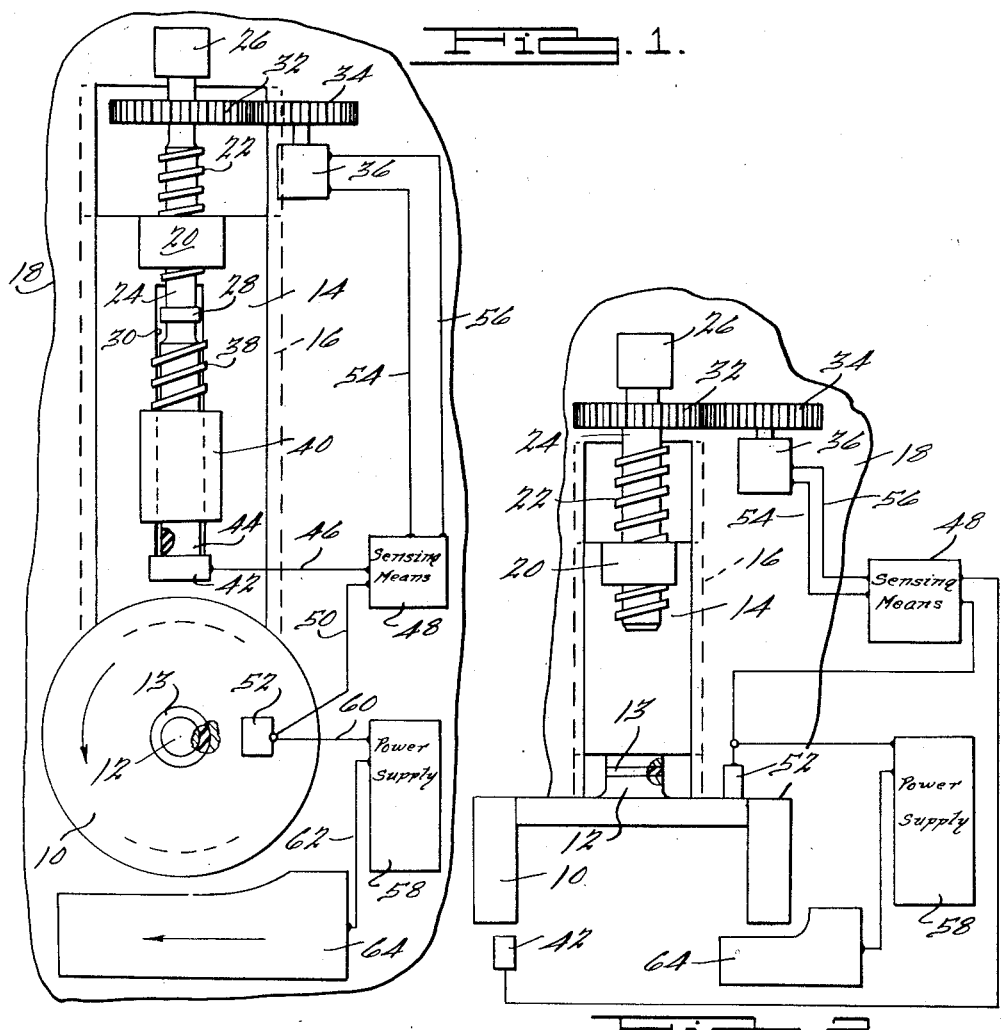
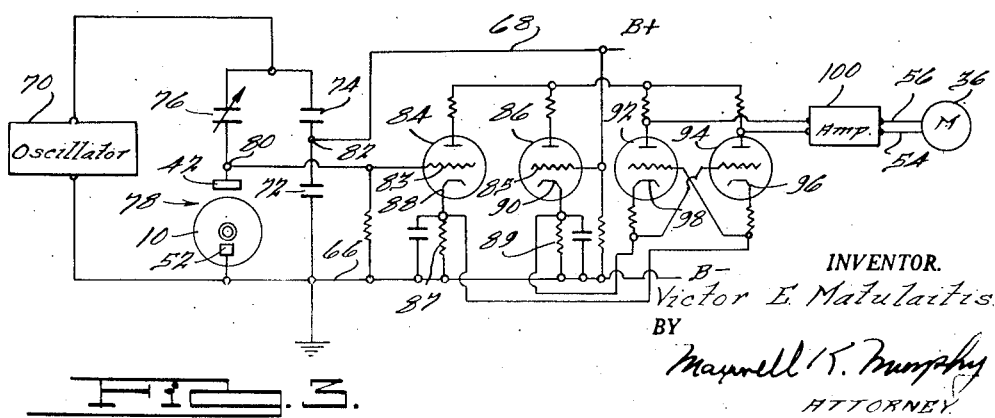
INVENTOR.
Victor E. Matulaitis
BY
Maxwell K. Murphy
ATTORNEY

United States Patent Office 2,818,491
Patented Dec. 31, 1957

2,818,491

ELECTRODE WEAR COMPENSATION

Victor E. Matulaitis, Franklin, Mich., assignor to Elox Corporation of Michigan, Clawson, Mich., a corporation of Michigan Application July 13, 1955, Serial No. 521,812

15 Claims. (Cl. 219—69)

This invention relates to improvements in the art of arc-machining and concerns both methods adn apparatus.

While machining of holes in hard, conductive workpieces by means of arc-machining (sometimes called "spark-machining," "metal-disintegrating," "electrical-discharge machining," etc.) has become quite well known during recent years, and improved methods and apparatus for such machining have gone into use, the development of grinding processes and apparatus utilizing arc-machining principles has lagged. This has been due in part to the fact that the electrode, which is usually a brass wheel, wears during operation and it is therefore difficult to maintain uniformity in size and finish without constant attention on the part of the operator.

The principal object of this invention is to provide a method and means for compensating for electrode wear such that the effect of the wear is substantially eliminated during electrical-discharge grinding.

Another object is to provide automatic grinding equipment by means of which high-production electrical-discharge grinding may be carried on.

Other objects and advantages will be apparent from the following specification wherein preferred forms of my invention are described.

In the drawings accompanying the specification in which reference characters have been used to designate corresponding parts referred to herein, Fig. 1 is a diagrammatic representation of a physical apparatus embodying my invention;

Fig. 2 is a similar diagrammatic showing of a similar apparatus which differs essentially from Fig. 1, only in that a cup-type of grinding wheel is employed; and Fig. 3 is a circuit diagram of the gap-sensing means of Figs. 1 and 2.

Diagrammatic representations of the actual apparatus have been used deliberately for the purpose of clarity and simplicity, and details of the arc-machining power supply and auxiliary components have been omitted because such constitute the inventions disclosed and claimed in certain other copending applications such as Serial No. 459,703, filed October 1, 1954, and Serial No. 338,789, filed February 25, 1953, now Patent No. 2,769,078, dated October 30, 1956. Reference is made to these applications and to McKechnie et al. Patent No. 2,588,744, for a full disclosure of the power and feed circuits now widely used in arc-machining practice.

It is deemed sufficient to state that in accordance with known practice in the art, an adequate supply of coolant is maintained in the machining area, and a suitable power supply is available.

Referring now to Fig. 1, it will be seen that I have shown an electrode 10 in the form of a metallic wheel. The wheel is mounted on a suitable spindle 12 through an insulating bushing 13, which spindle is rotated at desired selected speeds by means of a motor not shown. The motor may be coupled directly to the spindle or drivingly connected thereto by means of a belt or similar transmission means in accordance with machine tool practice.

The spindle 12 is suitably journaled on a ram or slide 14. The ram is mounted in ways 16 formed in the main frame 18 of the machine such that the ram is movable vertically but is rigidly supported.

Fixed to the ram 14 on its forward surface is a threaded nut or block 20 which engages the threads 22 of a screw 24. The latter is vertically elongated and is rotatably mounted at top and bottom in a pair of horizontally extending blocks 26, 28, carried by the machine frame 18. The ram 14 is provided with a slot 30 for accommodating the lower block 28.

Fixed to the screw 24, near the top thereof, is a gear 32 which engages a gear 34 carried on the shaft of an electric motor 36. The motor 36 is fastened to the frame 18. From the description so far, it will be clear that rotation of the shaft of motor 36 will cause a vertical displacement of the ram 14 through the intermediary of gears 34, 32, threads 22 and nut 20.

The screw 24 is provided with a second set of threads 38, which threads are twice the pitch of threads 22. A threaded block or nut 40 is carried on the threads 38 and this nut carries a sensing element 42 which is mounted thereon by means of an insulating piece 44. The nut 40 is independent of the ram 14 and moves relatively thereto but is mounted on the screw 24 such that it has slidable engagement with the ram. Thus rotation of the screw 24 will cause the nut 40 to be displaced vertically at twice the rate of the ram.

The sensing element 42 is of electrically conductive material and is connected by a conductor 46 with a sensing means 48. The latter is preferably an electronic device and will be described below. The sensing means 48 is also connected by conductor 50 with a brush 52 which bears constantly on the surfacce of the wheel 10. The brush 52 may be mounted by any suitable means on the frame 18 such that it constantly engages the wheel and is electrically insulated from the frame.

The output side of the sensing means 48 is connected with the motor 36 by conductors 54, 56. If necessary, an amplifier may be used to boost the output signal. The main power supply 58 for the arc-machining operation is connected with the brush 52 by conductor 60 and with the workpiece 64 by conductor 62. The workpiece is clamped to a conventional horizontal slide support (not shown) which may be traversed in the direction of the arrow by automatic feed mechanism in accordance with conventional grinding room practice. In the arc-machining process, the workpiece is generally placed in a pan and coolant is constantly circulated therein such that the gap area is always submerged.

The device as so far described operates as follows:

Let it be assumed that a grinding operation is in progress with a brass wheel 10 removing material from a conductive workpiece 64 by intermittent discharge across the gap therebetween in the presence of coolant and with the power supply 58 operating automatically to provide suitable voltage characteristics.

As the workpiece 64 moves across the bed of the machine and is machined by the grinding wheel 10, the wheel will inevitably wear away at its periphery and the diameter of the wheel will decrease. This decrease in size, indicated in exaggerated form by the dotted lines in Fig. 1, would, if not compensated for, result in a tapered surface being ground on the workpiece. However, in the instant apparatus, this change in diameter of the wheel 10 is immediately detected by the sensing element 42, which together with the wheel 10 constitutes one leg of a capacitance bridge which will be described later on herein.

The element 42 therefore signals the gap sensing means 48 which reacts instantly to cause rotation of the motor 36 in such direction that rotation of the screw 24 moves the ram 14 downwardly. At the same time, rotation of the screw 24 will move the element 42 downwardly a distance equal to twice the movement of the ram because of the difference in pitch of the threads 22 and 38.

When the wheel 10 and sensing element 42 have moved a sufficient distance to restore the preset conditions of the circuits when grinding was started, rotation of the motor 36 will cease. In practice, there may be some occasional overrun of the screw whereupon the motor will be reversed by the sensing means thereby to maintain the gap between the wheel 10 and the workpiece 64 constant regardless of wear of the wheel. In actual operation, this corrective function of the apparatus takes place progressively and continuously rather than in steps, as the above description assumes, and commercial installations have demonstrated the ability of the apparatus to maintain a substantially fixed space relationship between the wheel and the workpiece within limits of plus or minus ten-millionths of an inch. This accuracy of correction is, of course, dependent upon the discriminating ability of the gap sensing means 48 about to be described.

It will, of course, be apparent from the above that it is necessary to move the element 42 through twice the distance that the ram 14 is moved in order that the preselected distance between the element 42 and the periphery of the grinding wheel be maintained, because corrective movement of the wheel 10 in Fig. 1 is away from the element 42 which therefore must move through the space represented by the wear of the wheel plus the distance moved by the wheel to compensate therefor.

Referring now to Fig. 2, it will be seen that I have shown a similar setup for grinding except that in this instance, a cup-type of grinding wheel is used.

In this figure, a cup-wheel 10 of metal is mounted on a spindle 12, the latter being mounted on the vertical axis in a ram 14 suitably supported for sliding in ways 16 of a machine frame 18. The wheel is suitably driven by a motor (not shown) and a screw 24 threadedly engages a block 20 carried on the ram for vertically adjusting the latter through the intermediary of the motor 36 and gears 32 and 34 in accordance with signals received by the gap sensing means 48.

In Fig. 2, the brush 52 engages the grinding wheel 10 on the top side thereof and the gap sensing element 42 is disposed opposite the workpiece 64 in juxtaposition to the opposite side of the wheel. In this setup, it is unnecessary to move the element 42 as compensating movement of the wheel 10 is toward the element 42 which is in the same plane as the workpiece.

The operation of the Fig. 2 setup is identical with that of Fig. 1 for all practical purposes and will not be described in detail.

Reference is now made to Fig. 3 for a description of the gap sensing means 48. This figure is diagrammatic and it will be seen that an oscillator 70 capable of supplying a peak-to-peak signal voltage of 100 to 150 volts is connected into a capacity bridge circuit comprising the condensers 72, 74, 76, 78. The condenser 78 consists of the grinding wheel 10 and the sensing element 42; the condensers 72 and 74 are of suitable fixed capacity; and the condenser 76 is variable such that by adjustment thereof with a preselected gap, a balance is obtained that may be expressed as follows:

$$\frac{C_{76}}{C_{78}} = \frac{C_{74}}{C_{72}}$$

When so balanced, voltages of equal value and identical phase relationship appear at midpoints 80 and 82. These voltages are fed to the grids 83 and 85 of the triode vacuum tubes 84, 86, as shown. Equal D. C. voltages will then appear at cathodes 88 and 90, which cathodes are each connected to the negative power supply conductor 66 in shunt with networks 87, 89. These networks each comprise a condenser and resistor in parallel and function to smooth out the pulsations of voltage on the cathodes such that the voltages fed to tubes 92, 94 is substantially D. C. The voltages at 88 and 90 are coupled into the circuit feeding the differential amplifier tubes 92 and 94 respectively by connecting cathode 88 to cathode 96 and cathode 90 to cathode 98 respectively.

Conductor 68 is the positive side of the power supply to the tubes 84, 86, 92 and 94, which consists of a separate source of D. C. voltage in the order of 100 to 150 volts.

It will be noted that the grids of tubes 92, 94, are cross connected to the cathodes 96, 98, respectively so that the tubes 92, 94, function as a true "push-pull" amplifier. Thus it will be seen that these amplifier tubes are substantially independent of variations in the voltage output of oscillator 70 and an equal rise or fall in voltage at cathodes 88, 90, will not affect the output of amplifier stages 92, 94. However, differences in voltage at points 80 and 82 will cause an instant response by the "detector" tubes 84, 86, and the output of tubes 92, 94, will be affected accordingly.

In order to provide plenty of power for operating the motor 36, it is usually desirable to interpose an additional amplifier stage 100 in the circuit. The amplifier 100 may be a conventional bridge-type of any required sensitivity.

In the operation of the device, the voltage at point 82 acts as a "reference voltage" and is fixed at substantially one-half the voltage output of oscillator 70. The voltage at point 80 will also remain at substantially one-half oscillator output voltage so long as the capacitance bridge is balanced, i. e. so long as condenser 78, comprising wheel 10 and element 42, remains at preset value.

When, due to wheel wear, the gap between the wheel (electrode) and the workpiece increases, a decrease in capacity of condenser 78 will occur, and the sinusoidal voltage across condenser 78 will increase with respect to point 82 of the circuit. Similarly, should the gap decrease in size for some reason, such as over-correction of motor 36 in response to a signal of increasing gap size, the capacity of condenser 78 will increase with consequent decrease in voltage thereacross with respect to point 82.

The instantaneous voltages at cathodes 88 and 90 are in direct proportion to the respective voltages at 80, 82. The voltages at 80, 82, are substantially D. C. in nature as described above and the voltage at 90 is substantially fixed and constant. The control system is therefore essentially "single-ended" through the detector stage inasmuch as only the voltage at cathode 88 varies. Because of the cross-interconnection of the grids and cathodes of the tubes 92, 94, the output of the amplifier tubes is a true difference or push-pull voltage.

It is thus apparent that changes in value of voltage at point 80 will signal a change in size of the arc-gap and through the detector and amplifier stages just described will cause rotation of the armature of motor 36 in one direction or the other to compensate for the change in gap size whether it be increase or decrease.

While I have shown only two types of grinding setups and only one type of electronic sensing control, it will be obvious to those skilled in the art that such has been done for illustrative purposes only and such is not to be construed as limiting the scope of my invention in any way.

For example, my invention may be readily applied to planing or milling as well as grinding. In other words, the wheel 10 in Fig. 1 might be a stationary element which would plane or mill the piece 64 by arc-discharge as the latter is fed across the work table. Furthermore, "contour milling" or "form-grinding" is easily accomplished simply by forming the mill or wheel with the proper profile and providing suitable dressing means for maintaining said profile.

It also will be appreciated by those skilled in the art that my invention is not solely limited in application to arc-machining. The wheels 10 in Figs. 1 and 2 (or a milling cutter for that matter) could as well be conventional tools intended to remove stock from the workpiece by mechanical engagement therewith. In the case of a milling tool or of a metal-bonded abrasive wheel, my invention is readily applicable as shown herein practically without alteration. In the case of a vitrified wheel, a resin bonded wheel or the like, it would of course be necessary to introduce sufficient conductive material into the wheel mix to provide a path for eddy currents.

I claim:

1. In an apparatus for grinding a conductive workpiece by means of intermittent electrical discharge across a gap between a rotating grinding element and the workpiece, servo-means for feeding the grinding element toward the workpiece and for maintaining predetermined space relationship therebetween, means for controlling said servo-means comprising a sensing element disposed in predetermined space-relation to said grinding element, and means operable in response to change in said space-relation for actuating said servo-means.

2. The combination of claim 1 wherein said operable means comprises a capacitance bridge.

3. The combination of claim 1 wherein said operable means comprises a capacitance bridge interconnected with said grinding element and said sensing element such that said elements constitute one of the capacitances of said bridge.

4. The combination of claim 1 wherein said servo-means includes a reversible motor, a power supply, means for controlling said power supply such that said motor is caused to exert force in one direction or the other, said control means comprising an electronic amplifier, an electronic detector feeding said amplifier and a capacitance bridge circuit connected with said detector, said bridge circuit being normally balanced but subject to instant unbalance in response to said change in space relation.

5. The combination of claim 4 wherein said grinding element and said sensing element constitute one capacitance of said bridge circuit.

6. In combination with a grinding wheel and a workpiece, means establishing a closed electric circuit through said wheel and workpiece, servo-means for feeding said grinding wheel toward said workpiece and for maintaining predetermined space-relation therebetween, means for controlling said servo-means comprising a sensing element disposed in predetermined space-relation with said wheel and means operable in response to change in said latter space-relation for actuating said servo-means.

7. The combination of claim 6 wherein said control means comprises a capacitance bridge.

8. The combination of claim 6 wherein said control means comprises a capacitance bridge, said grinding wheel and said sensing element constituting one capacitance of said bridge.

9. The combination of claim 8 wherein said bridge is normally balanced but subject to unbalance in response to change in space-relation between said wheel and sensing element, and means including an electronic detector and amplifier for actuating said servo-means in response to such unbalance.

10. In combination with an apparatus for grinding a conductive workpiece by means of intermittent electrical discharge between said workpiece and a grinding wheel, means for compensating for wear of said wheel including servo-means operable automatically in response to decrease in size of said wheel to feed said wheel toward the workpiece thereby to eliminate discrepancies due to such decrease in size, and means for controlling operation of said servo-means comprising a sensing element disposed in predetermined space-relation to said grinding wheel and means operable in response to change in said space-relation for causing operation of said servo-means to restore said predetermined space relationship.

11. In a grinding apparatus, a grinding wheel, means mounting said wheel including an arbor and a ram carrying said arbor and mounted for sliding movement to feed said wheel toward said piece, a servo-means operably associated with said ram for moving the latter through its sliding movement, means for controlling said servo-means including a sensing element disposed in predetermined space-relation to said wheel and means operable in response to change in said space-relation for causing actuation of said servo-means.

12. The combination of claim 11 wherein said wheel is of the peripheral grinding type and said sensing element is mounted such that feeding movement of said wheel is away from said sensing element, and means actuated by said servo-means for feeding said sensing element toward said wheel upon feeding movement thereof at such rate that said predetermined space-relation is substantially constantly maintained.

13. In a grinding apparatus, a grinding wheel, an arbor mounting said wheel, a ram carrying said arbor, means mounting said ram for linear sliding movement, means for sliding said ram including a driven screw and a nut on said ram engaging said screw, said screw having a helical portion of different pitch than the portion engaged by said nut, a second nut engaging said second helical portion, a sensing element carried by said second nut, and means operable in response to change in space-relation between said wheel and said sensing element for controlling the driving means for said screw.

14. The method of automatically compensating for grinding wheel wear during grinding which comprises, measuring the size of the wheel at a point remote from the workpiece, moving the wheel toward the workpiece as the wheel decreases in size and simultaneously moving the measuring means toward the wheel to maintain predetermined space-relationship between said wheel and said measuring means.

15. The method of automatically continuously compensating for wear of a tool during operation of said tool comprising connecting the tool into an electrical capacitance bridge circuit as one side of a capacitance in said circuit, measuring the change in value of said capacitance as the tool wears, and adjusting said tool and the other side of said capacitance simultaneously to restore initial value of said capacitance.

References Cited in the file of this patent

UNITED STATES PATENTS

| 863,643 | Ransom | Aug. 20, 1907 |
| 1,871,752 | Simonds | Aug. 16, 1932 |
| 2,526,423 | Rudorff | Oct. 17, 1950 |
| 2,656,507 | Fielden | Oct. 20, 1953 |

FOREIGN PATENTS

| 1,024,353 | France | Jan. 10, 1953 |
| 1,062,480 | France | Dec. 9, 1953 |
| 1,065,986 | France | Jan. 13, 1954 |